US012446139B2

(12) United States Patent

Maresca

(10) Patent No.: US 12,446,139 B2
(45) Date of Patent: Oct. 14, 2025

(54) DEVICE FOR VISUALIZING LIGHT EFFECTS ON A STRING MUSICAL INSTRUMENT

(71) Applicant: VISUAL NOTE S.R.L., Milan (IT)

(72) Inventor: Vincenzo Maresca, Terracina (IT)

(73) Assignee: VISUAL NOTE S.R.L.

( * ) Notice: Subject to any disclaimer, the term of this patent is extended or adjusted under 35 U.S.C. 154(b) by 274 days.

(21) Appl. No.: 18/272,292

(22) PCT Filed: Jun. 22, 2021

(86) PCT No.: PCT/IB2021/055485
§ 371 (c)(1),
(2) Date: Jul. 13, 2023

(87) PCT Pub. No.: WO2022/157560
PCT Pub. Date: Jul. 28, 2022

(65) Prior Publication Data

US 2024/0064884 A1 Feb. 22, 2024

(30) Foreign Application Priority Data

Jan. 25, 2021 (IT) ........................ 102021000001259

(51) Int. Cl.
*H05B 47/175* (2020.01)
*G10D 1/08* (2006.01)
*G10G 7/00* (2006.01)
*G10H 1/00* (2006.01)
*H05B 45/20* (2020.01)

(52) U.S. Cl.
CPC ........... *H05B 47/175* (2020.01); *G10D 1/085* (2013.01); *G10G 7/00* (2013.01); *G10H 1/0008* (2013.01); *H05B 45/20* (2020.01); *G10H 2220/066* (2013.01); *G10H 2220/161* (2013.01); *G10H 2220/395* (2013.01)

(58) Field of Classification Search
CPC ...... H05B 47/175; H05B 45/20; G10D 1/085; G10G 7/00; G10H 1/0008; G10H 2220/066; G10H 2220/161; G10H 2220/395
See application file for complete search history.

(56) References Cited

U.S. PATENT DOCUMENTS 4,236,191 A * 11/1980 Martinez .............. G02B 6/0005 362/86
4,563,933 A * 1/1986 Kim ......................... G10D 3/00 84/267

(Continued)

*Primary Examiner* — Robert W Horn
(74) *Attorney, Agent, or Firm* — R. Ruschena Patent Agent, LLC

(57) ABSTRACT

A device for visualizing light effects on a string musical instrument, such as a bass or guitar, during a song execution, comprising a light device (1) provided with a plurality of RGB led lights and a controller (20) configured to control the switching on, the switching off and the color of each one of said led lights, characterized in that it comprises further remote control means (30), removably fastened to the instrument and configured to communicate with said controller (20) to allow the selection of a functioning mode of said LED lights between a plurality of pre-set functioning modes, and in that said pre-set modes of visual effects visualization comprise at least a mode whose lights switching on and off are functions of the music played by the instrument.

8 Claims, 1 Drawing Sheet

(56) References Cited

U.S. PATENT DOCUMENTS

| | | | | |
|---|---|---|---|---|
| 4,745,837 | A * | 5/1988 | Rimsa | G10D 3/00<br>84/291 |
| 4,809,584 | A * | 3/1989 | Forrest | A63J 17/00<br>362/811 |
| 7,173,175 | B2 * | 2/2007 | Shaffer | G10G 1/02<br>84/477 R |
| 7,504,578 | B2 * | 3/2009 | Lewry | G10H 3/143<br>84/743 |
| 8,697,977 | B1 * | 4/2014 | Lysaght | G10H 1/0016<br>84/626 |
| 9,324,307 | B1 * | 4/2016 | Castillo | G10D 3/00 |
| 9,564,109 | B2 * | 2/2017 | Boxberger, Jr. | G10D 1/085 |
| 9,699,867 | B2 * | 7/2017 | Horist | H05B 47/12 |
| 10,005,000 | B2 * | 6/2018 | Tan | G11B 27/34 |
| 10,010,806 | B2 * | 7/2018 | Lee | H05B 45/20 |
| 10,013,962 | B2 * | 7/2018 | Washington | G10G 5/005 |
| 10,102,835 | B1 * | 10/2018 | Shah | G06F 3/011 |
| 10,339,905 | B2 * | 7/2019 | Washington | F21V 23/009 |
| 10,403,167 | B2 * | 9/2019 | Borko | G09B 15/023 |
| 11,688,374 | B2 * | 6/2023 | Macias | G10H 1/0008<br>84/464 A |
| 12,272,260 | B2 * | 4/2025 | Maresca | G09B 15/003 |
| 2005/0126373 | A1 * | 6/2005 | Ludwig | G06F 3/04847<br>84/661 |
| 2017/0175986 | A1 * | 6/2017 | Wilczynski | G10H 1/32 |
| 2017/0278496 | A1 * | 9/2017 | Lin | G09B 15/023 |
| 2019/0363583 | A1 * | 11/2019 | Kawahashi | H02J 50/20 |
| 2020/0273439 | A1 * | 8/2020 | Starr | G10H 1/0008 |
| 2021/0318847 | A1 * | 10/2021 | Sullivan | G10L 25/51 |

* cited by examiner

DEVICE FOR VISUALIZING LIGHT EFFECTS ON A STRING MUSICAL INSTRUMENT

BACKGROUND OF THE INVENTION

1. Field of the Invention

The present invention relates to a device for visualizing light effects on a string musical instrument, configured to allow the musician playing the instrument, for example a guitar, to control light effects.

2. Brief Description of the Prior Art

At the state of the art, there are known many embodiments of devices configured to integrate light effects with musical instruments, which use led lights and control means integrated in the instruments in many ways. A first example is shown in document U.S. Pat. No. 423,619, where a guitar is described, which comprises a plurality of integrated LED lights, controlled by a device provided with button controls. A conceptually similar example is shown in document U.S. Pat. No. 4,563,933.

Document DE4141390 describes instead inserts containing LED lights or optical fibres which can be integrated in the construction of musical instruments, in particular in the neck of a guitar. Many other examples are known at the state of the 5-art, as the ones described in documents WO2009046934, CN1702735, US201706872.

Finally, document US2005126373 describes a complex control system for integrating visual effects during a musical performance, both concerning light devices integrated in the instruments, and light devices integrated and amplifiers or any other element provided on the stage.

Technical Problem

To the best of the present inventor's knowledge, anyway, there exist no devices allowing an easy integration of visual effects, and in particular of light effects, in existing musical instruments, so without the need to provide light effects yet in the instrument construction step, which allow an efficient management of light effects by the musician during the song execution, and that at the same time do not require also outer control devices (which would cause inevitably transportation difficulties).

SUMMARY OF THE INVENTION

Therefore, aim of the present invention is a device allowing to integrate inside existing musical instruments, and in particular in string instruments such as for example a bass or a guitar, the function of producing light decorative effects, which overcomes the limits linked to the device known at the state of the art, and in particular which allows the musician to control visual effects rapidly, also during the song execution.

DETAILED DESCRIPTION OF THE INVENTION

Figure 1:
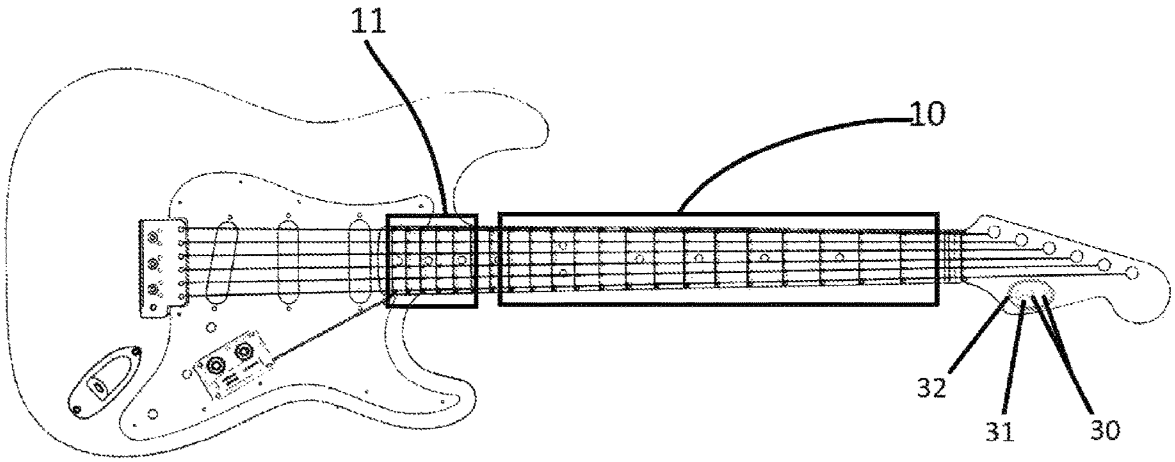
FIG. 1 shows the location of the two sub-assemblies in the case of a guitar.
Figure 2:
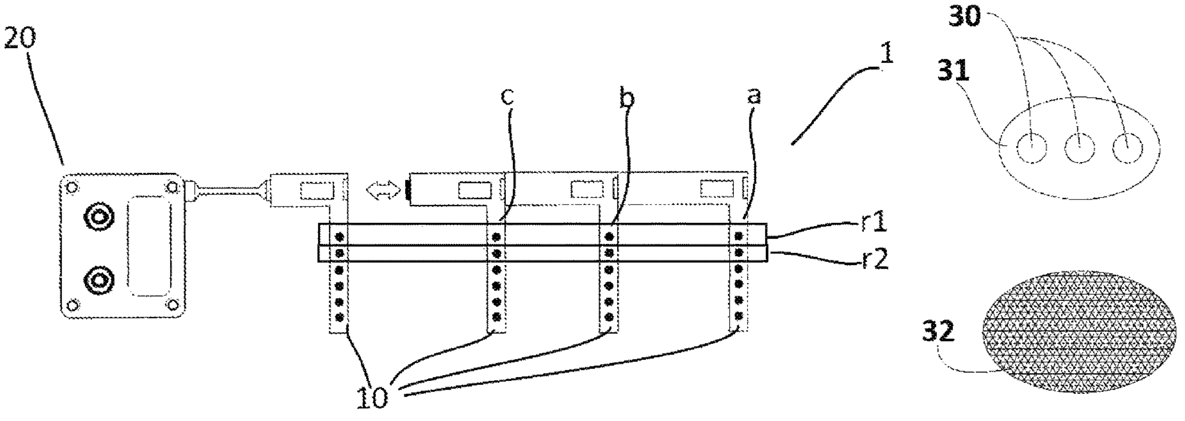
FIG. 2 shows two schematic views of an embodiment of the device.

The device according to the present invention comprises a light device (1) and a controller (20).

The device (1) according to the invention comprises a plurality of RGB led lights. Said lights are preferably organized in a plurality of columns (a, b, c) and a plurality of lines (r1, r2), and the device is configured so that each column corresponds to a key of the keyboard of a string instrument, such as a guitar or a bass, and each line corresponds to a string. So, preferably, there will be six lines in case of a guitar.

Each LED lights column is positioned on a respective adhesive support (10) configured to be glued to the handle of the string instrument, under the strings.

So, each LED light is combined univocally with each key of the instrument keyboard, and it can be identified by the definition of the respective line and column.

It is to be specified that for RGB LED light it is intended a LED configured so that the color of its own light emission can be changed as a function of the instruction applied by means of a respective controller.

Moreover, preferably, the device comprises a plurality of other RGB LED lights, positioned on respective adhesive supports and configured to be glued on the body of the instrument, in arbitrary positions-.

The device (1) comprises also a controller (20), configured to control the switching on, the switching off and the color of each one of said led lights.

The device according to the invention is characterized in that it comprises also remote control means (30), fastened to the instrument and configured to communicate with said controller (20), thus allowing the selection of a functioning mode of said LED lights, selected among a plurality of pre-set functioning modes.

In a preferred but not limiting embodiment, said remote control means (30) and said controller (20) coincide, this meaning that they are integrated inside a unique casing applied to the instrument.

Moreover, said controller (20) comprises preferably audio acquisition means configured to acquire the sound emitted by the instrument. In a first embodiment, said audio acquisition means comprise an inlet for an audio connector connected to the microphones provided on the instrument; in a second embodiment said audio acquisition means comprise microphones configured to detect the sound emitted by the string of the instrument.

Said remote control means comprise preferably a removable body (31) and a terminal board (32) which can be fastened to said musical instrument in a position chosen by the musician, thus optimizing the control ergonomics.

The terminal board (32) is preferably fastened to the instrument body by means of adhesive fastening means.

Said body (31) and said terminal board (32) are preferably provided with removable fastening means allowing to fix the body (31) to the terminal board (32).

Moreover, preferably, said body (31) comprises a movement sensor, which in a preferred embodiment is a triaxial accelerometer.

Said removable body (31) comprises control means configured to select a mode of visual effects among a plurality of pre-set modes, in addition to control electronic means configured to acquire signals from said control means and said movement sensor and to send said signals to said controller (20) by means of said remote communication means.

The device is characterized in that said pre-set visualization modes of the visual effects comprise at least a mode whose lights switching on and off are functions of the music played by the instrument, and at least a mode whose said lights switching on and off are functions of the signal detected by said movement sensor.

The assembly of all what is contained in the removable body (31) allows to switch from a mode to the other one easily and without the need of outer controls, according to the musician artistic choices.

Preferably, the controller (20) is configured so that when said mode is selected whose lights switching on and off are functions of the music played by the instrument, the LED lights are switched on with a rhythm proportional to the music rhythm played, and in such a number that a light intensity proportional to the volume of the music played is created.

Moreover, said controller (20) is preferably configured so that when said mode is selected whose said lights switching on and off are functions of the signal detected by said movement sensor, the LED lights are switched on with a rhythm proportional to the movements detected by said sensor and in such a number that a light intensity proportional to the acceleration value detected by said sensor is created.

In another embodiment, said movement sensor is fastened to said instrument in a position other than the position of said removable body (31), and communicates with said removable body by means of remote communication means.

Therefore, it is obtained to position the commands close to the musician's hands, and to obtain instead the indication of the movement of the guitar or bass at a position, such for example the headstock, which is mainly subjected to wide excursions in case of movements of the musician while playing.

To such aim, said body (31) comprises preferably also selection means of at least a coefficient of proportionality, which allows the musician to vary the proportional factor, as he likes, between said accelerations or said volume of the music played, and the light intensity emitted as a whole by the device.

In a first embodiment, said control means comprise a plurality of knobs. At least a knob is configured to be positioned in a plurality of predetermined positions, each one corresponding to a respective functioning mode; at least a knob is configured to indicate to said removable body (31) the coefficient of proportionality between said accelerations or said volume of the music played, and the light intensity emitted as a whole by the device.

In a second embodiment said control means comprise a touch sensitive surface, configured to be provided with at least a first portion through which said musician can select the desired functioning mode, and a second portion through which said musician can select said factor of proportionality.

In such an embodiment, the factor of proportionality can be indicated by the musician by means of a codified instruction, such as for example a movement of the finger upwards to set up an increase of such coefficient of proportionality, or a movement of the finger downwards to set up a reduction of such coefficient of proportionality.

Preferably, but not limitingly, the functioning mode can be set up by means of codification of a second instruction. For example, the various functioning modes can be numbered and the musician can pass from the one to the other one by applying a series of strokes with the finger as the number relating to the desired functioning mode.

Moreover, said controller (20) is preferably provided with remote communication means, such as for example Bluetooth communication means, to allow via a remote device, such for example a smartphone or tablet, the setting of the functioning parameters. From what just said, it is clear that the remote device is needed only in a personalization starting step of the interface, and it is not needed in any way during the song execution.

Its usefulness is linked to the fact that in the interface personalization starting step, the provision of a display of great dimensions makes the user interaction easier.

The invention claimed is:

1. A device for visualizing light effects on a string musical instrument, during a song execution, comprising:

a device (1) provided with a plurality of RGB led lights and a controller (20) configured to control the switching on, the switching off and the color of each one of said led lights, remote control means (30), removably fastened to the instrument and configured to communicate with said controller (20) to allow the selection of a functioning mode of said LED lights between a plurality of pre-set functioning modes, said pre-set modes of visual effects visualization comprising at least a mode whose lights switching on and off are functions of the music played by the instrument, and wherein said remote control means comprise a removable body (31) and a terminal board (32) which can be fastened to said musical instrument in a position chosen by the musician, in that said removable body (31) comprises further a triaxial accelerometer and in that said pre-set modes of visual effects visualization comprise at least a mode whose said lights switching on and off are functions of the signal detected by said triaxial accelerometer;

and wherein said body (31) comprises further a movement sensor.

2. The device according to claim 1, wherein said movement sensor is fastened to said instrument in a position other than the position of said removable body (31), and communicates with said removable body by means of remote communication means.

3. The device according to claim 1, wherein said controller (20) comprises audio acquisition means configured to acquire the sound emitted by the instrument.

4. The device according to claim 1, wherein said removable body (31) and said terminal board (32) are provided with removable fastening means allowing to fix the body (31) to the terminal board (32).

5. The device according to claim 1, wherein said control means comprise a plurality of knobs, at least a knob being configured to be positioned in a plurality of predetermined positions, each one corresponding to a respective functioning mode, and at least a further knob being configured to indicate to said removable body (31) the coefficient of proportionality between acceleration value detected by said accelerometer or said volume of the sound emitted by the instrument and the light intensity emitted as a whole by the device.

6. The device according to claim 1, wherein said control means comprise a touch sensitive surface, configured to be provided with at least a first portion through which said musician can select the desired functioning mode, and a second portion through which said musician can select said factor of proportionality.

7. The device according to claim 1, wherein said LED lights are positioned on respective adhesive supports (10) configured to be glued to handle of said string instrument, under the strings.

8. The device according to claim 1 further comprising a plurality of other RGB LED lights, positioned on respective adhesive supports and configured to be glued on the body of the instrument, in arbitrary positions.

* * * * *